Oct. 20, 1931.    R. G. BACHELLER    1,828,213
GLASS HANDLING APPARATUS
Filed May 28, 1926    2 Sheets-Sheet 1
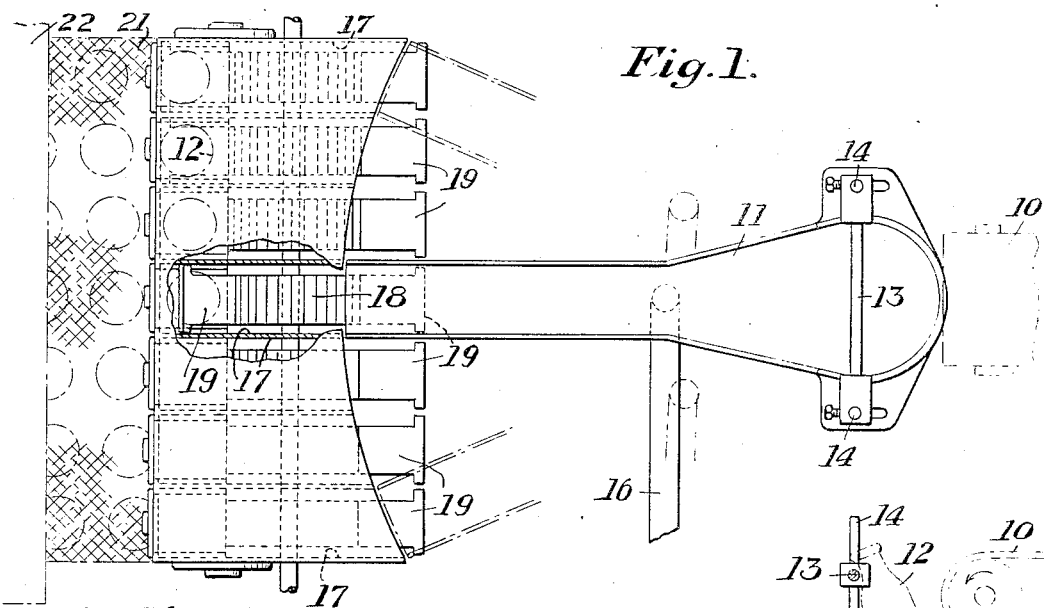
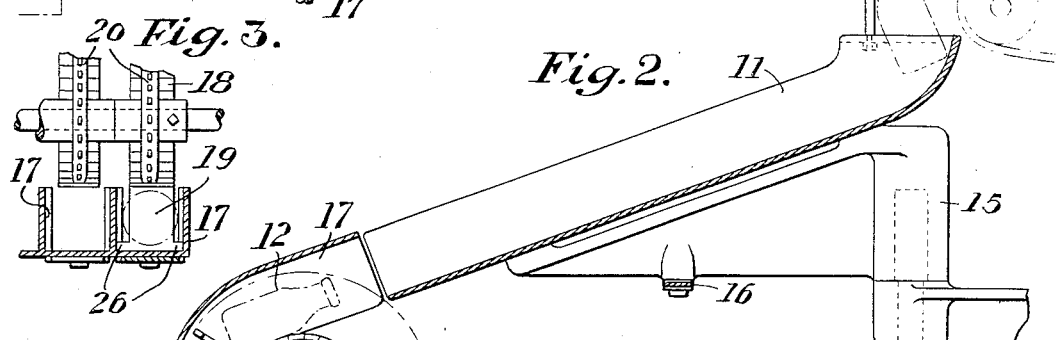
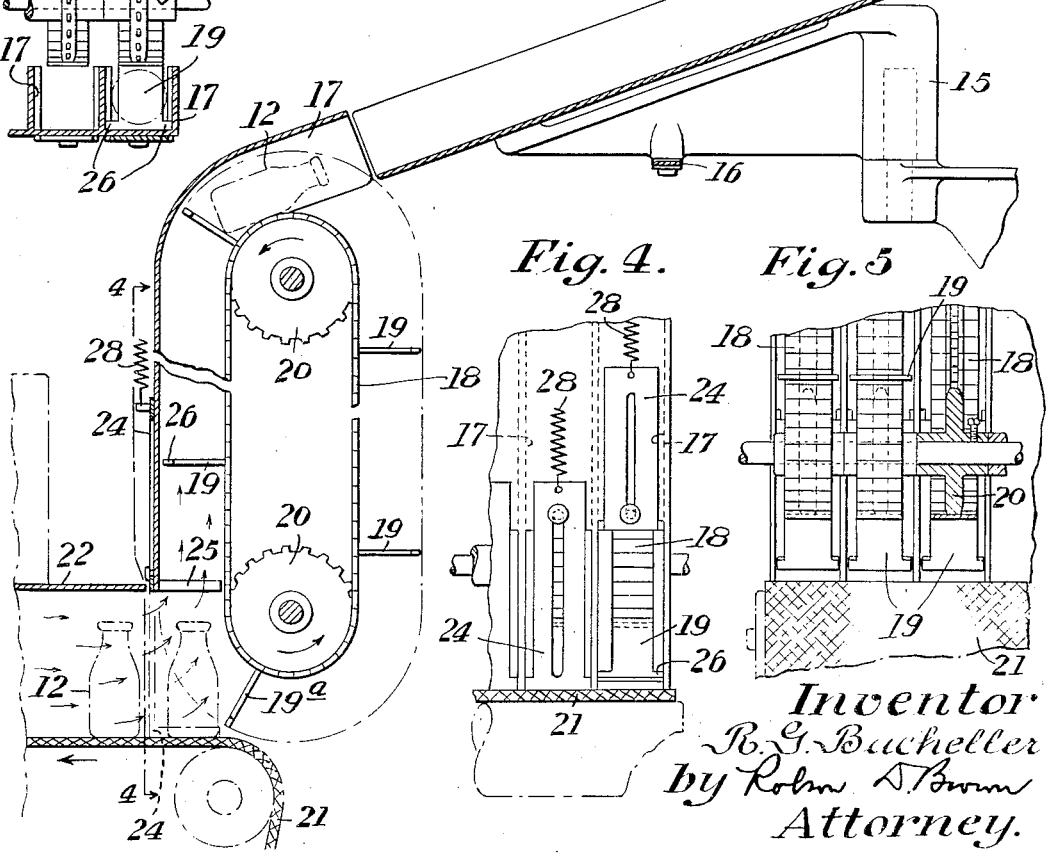
Inventor
R. G. Bacheller
by Robin A. Brown
Attorney.

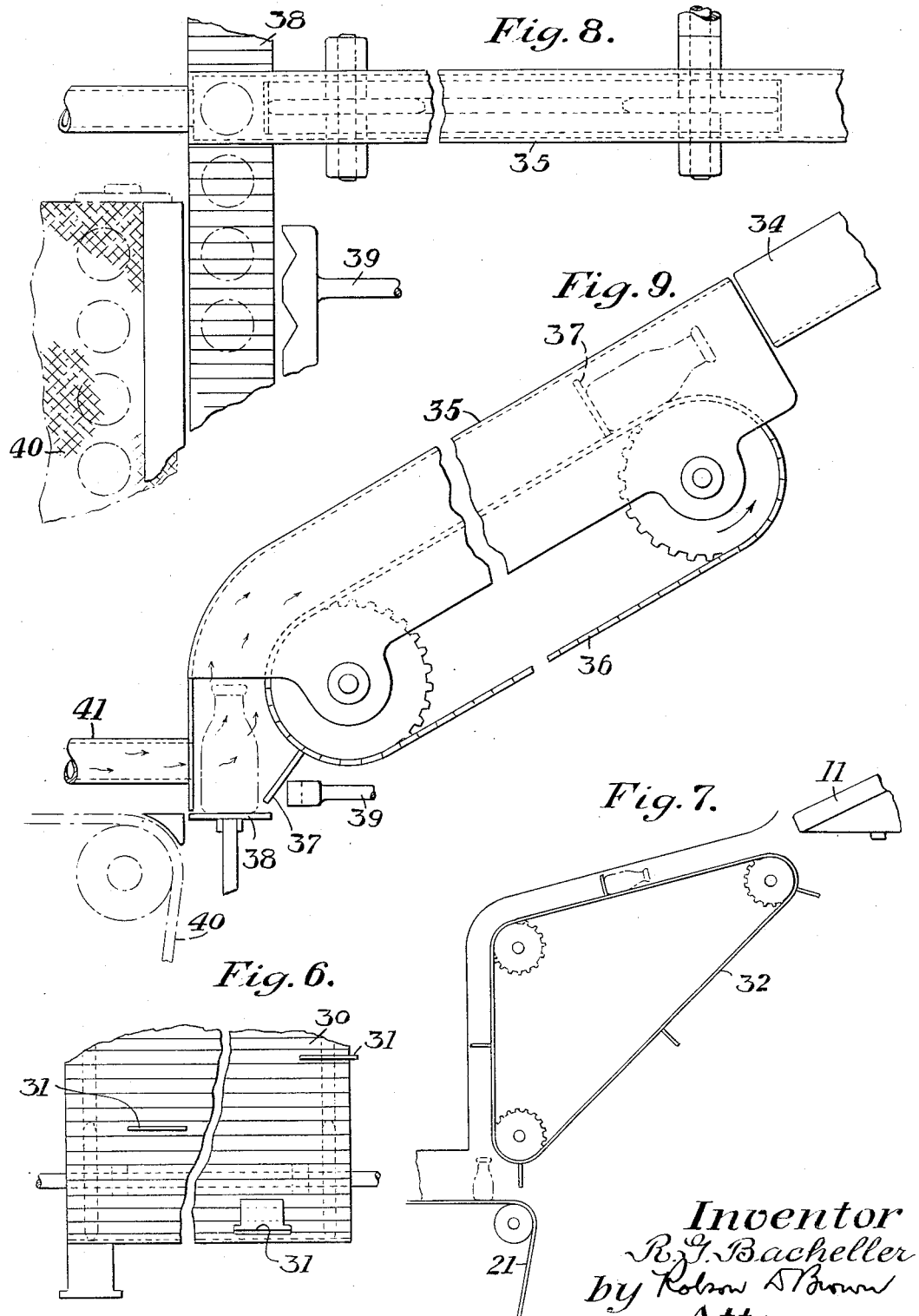

Patented Oct. 20, 1931

1,828,213

UNITED STATES PATENT OFFICE

RAYMOND G. BACHELLER, OF HARTFORD, CONNECTICUT, ASSIGNOR TO HARTFORD-EMPIRE COMPANY, OF HARTFORD, CONNECTICUT, A CORPORATION OF DELAWARE

GLASS HANDLING APPARATUS

Application filed May 28, 1926. Serial No. 112,271.

My invention relates to apparatus which is particularly suitable for handling articles of glass, but which may also be employed for handling various other classes of articles and materials. The invention is especially useful in connection with the transfer of glassware from a forming machine to a lehr.

One object of my invention is to provide handling apparatus that may be operated in timed relation to the delivery of articles thereto, and which may transfer the glassware to a lehr at a different floor level than that at which the ware is delivered to the said apparatus.

Another object of my invention is to simplify and improve generally the construction and operation of apparatus for handling glassware or other articles.

Some of the forms which my invention may take are shown in the accompanying drawings, wherein Fig. 1 is a plan view, partially broken away, of apparatus embodying my invention; Fig. 2 is an elevational sectional view of the apparatus of Fig. 1; Fig. 3 is a sectional plan view of a portion of the apparatus shown in Fig. 2; Fig. 4 is a view taken on the line 4—4 of Fig. 2; Fig. 5 is a fragmentary elevational view, looking from the right hand side of Fig. 2; Fig. 6 is a view showing a modification of the apparatus of Figs. 1 and 2; Fig. 7 shows still another modified form of said apparatus, and Figs. 8 and 9 are fragmentary plan and elevational views, respectively, of a third modification.

Referring to Figs. 1 and 2, glassware may be delivered from a forming machine (not shown) by a conveyer 10, or by a suitable takeout device, to a chute 11. As the bottles 12 fall into the chute 11, the upper portions thereof engage a stop bar 13 that is adjustably mounted on the posts 14 which are secured to the chute.

The chute is mounted upon a pivoted bracket 15 that may be oscillated by a link 16, in any suitable manner, in timed relation to the delivery of the bottles 12 thereto, so that the chute will be moved through one cycle during the time that is required to deliver seven bottles thereto, for example. The lower front edge of the chute 11 moves through an arc as indicated in Fig. 1 and is brought into successive registration with compartments 17 that have front and side walls, as indicated more clearly in Fig. 3.

At the rear open side of each compartment 17, a conveyer belt 18 is mounted that carries shelves 19 for supporting the bottles as they are delivered from the chute 11. The conveyer belts are mounted on sprocket wheels 20 that are driven from any suitable source of power—preferably in definite relation to movements of the chute 11, so that when the chute reaches a given compartment, the conveyer associated with that compartment will have one of its shelves 19 in proper position to receive a bottle. The conveyers lower the bottles to a lehr belt 21 that carries them into a lehr 22.

In order to prevent the bottles falling on their sides when the shelves 19 approach the position indicated at 19a in Fig. 2, a sliding door or gate 24 is provided in the front wall of each of the compartments 17. This gate has a pair of inwardly extending projections 25 that are engaged by projections 26 on shelves 19 so that as a bottle approaches the lehr belt 21, the gate 24 is drawn downward against the tension of a spring 28 to the position indicated in dotted lines in Fig. 2. The gate is thus in position to be engaged by the upper end of a bottle as it falls forwardly from the shelf 19. When the shelf has passed out of engagement with the gate as indicated at 19a the projections 25 passing one on each side of the bottle (see Fig. 3), the gate is returned by the spring 28 to its upper position, permitting the bottle to be carried into the lehr 22, and also permitting a flow of heated air from the lehr into the compartment, thereby either preventing excessive cooling of the bottles while being transferred from the chute, or increasing the temperature thereof.

Referring to Fig. 6, I provide a single, wide chain belt 30 instead of the plurality of belts 18 of Figs. 1 and 2. Shelves 31 corresponding to the shelves 19 are mounted on the belt 30 in staggered relation, so that one of the shelves will be in position to receive a bottle from the chute 11 at each discharge point in its path of travel along the face of the belt.

In Fig. 7, I show a belt 32 that has three flights, instead of two flights. The three flights permit of transferring the bottles in a generally horizontal direction, in addition to lowering them to a level beneath that at which they are delivered to the belt by the chute 11.

In Figs. 8 and 9, I have shown an arrangement of apparatus, whereby the bottles are delivered to a lowering device from a stationary chute 34. As the bottles leave the chute 34 they enter a compartment 35 in which the upper flight of a chain belt 36 travels. The belt is provided with shelves 37 that carry the bottles to a cross conveyer 38 which is preferably moved periodically in definite relation to the movement of the lowering conveyer 36.

When a given number of bottles have been deposited upon the conveyer 38, or the conveyer has traveled a given distance, a pusher bar 39 is actuated in any suitable manner, and preferably in timed relation to the movement of the conveyer, to push the bottles from the conveyer to a traveling belt 40 that carries the bottles into a lehr (not shown). The interior of the compartment 35 may be heated by hot gases introduced through a pipe 41.

From the foregoing, it will be seen that I provide means for automatically and systematically transferring glass articles from a given point to a lehr that may be located at a different level than that at which the articles are delivered, and at any horizontal distance therefrom.

I claim as my invention:

1. Article-handling apparatus comprising a plurality of shelves laterally and vertically offset with respect to one another, means for delivering articles to said shelves in succession, and means for imparting traveling movement to said shelves with respect to the said delivering means.

2. Article-handling appartus comprising a plurality of shelves laterally and vertically offset with respect to one another, means for delivering articles to said shelves in succession, and means for imparting traveling movement to said shelves in timed relation to the delivery of articles thereto.

3. Article-handling apparatus comprising a plurality of movable shelves offset transversely with respect to one another, and means for delivering articles to said shelves, comprising a delivery member, movable transversely of the paths of movement of the shelves.

4. Article-handling apparatus comprising a plurality of movable shelves offset transversely with respect to one another, and means for delivering articles to said shelves, comprising a chute pivoted at its rear end and having its forward end adjacent to and movable transversely of the paths of movement of said shelves.

5. Article-handling apparatus comprising a plurality of shelves movable in paths disposed at an angle to the horizontal and laterally offset relative to one another, and means for delivering articles to said shelves, comprising a delivery member that is movable transversely of the said paths.

6. Article-handling apparatus comprising an inclined chute, a chain conveyer having one of its flights disposed at an angle to the horizontal and in position to receive articles from the chute, means for transferring the articles from said conveyer to a receiving surface in an upright position, a hood enclosing the article-bearing flight of said conveyor, and means for directing a heatng medium through said hood.

7. Bottle-handling apparatus comprising a chute for delivering bottles, a conveyer disposed beneath said chute in position to receive the bottles discharged therefrom, means for removing the bottles from the conveyer in an upright position, a hood enclosing the article-bearing flight of said conveyor, and means for directing a heating medium through said hood.

8. Article-handling apparatus comprising a conveyer mounted in fixed relation between a plurality of receiving points and a plurality of delivery points, the receiving points being above the delivery points, means for delivering successive articles to said receiving points, a hood partially inclosing said conveyor, and means for directing a heating medium through said hood.

9. Article-handling apparatus comprising a belt having one of its flights vertically disposed, a plurality of shelves carried by said belt and disposed laterally thereof, and a chute mounted for lateral movement relative to said belt, for delivering articles to each of said shelves.

10. Article-handling apparatus comprising a belt having one of its flights vertically disposed, a shelf carried by said belt and extending laterally thereof, a conveyer below said belt and disposed in a horizontal plane, means for delivering articles to said shelf at an upper level for transfer to the conveyor, and means other than the shelf and the belt for retaining the articles in upright position during transfer from the shelf to the conveyer.

11. Article-handling apparatus comprising a chute, a conveyor mounted on a fixed support and having one of its flights disposed at an angle to the horizontal, means for moving said chute laterally to distribute articles transversely of said conveyor, and a carrier disposed in position to receive at a plurality of points the articles transferred by said conveyor.

12. Article-handling apparatus, comprising a chute, a conveyor belt having one of its flights disposed at an angle to the horizontal, a shelf carried by the belt in position to receive articles delivered from said chute, a carrier disposed in position to receive articles transferred by said belt, and means movable with said belt throughout a portion of the travel thereof, for maintaining said articles in an upright position during the transfer of said articles from said shelf to said carrier.

13. Article-handling apparatus comprising a conveyer belt disposed in a vertical plane, an article support carried by said belt, a receiving surface, and means actuated by said belt for effecting transfer of articles therefrom to the receiving surface in an upright position.

14. Article-handling apparatus comprising a chain having a portion thereof movable in a substantially vertically disposed path, a shelf on the chain, a conveyer adjacent to the lower limit of movement of the shelf and disposed in a horizontal plane, and a guard plate above the conveyer, in position to engage articles as they slide off the shelf and maintain them in upright position.

15. Article-handling apparatus comprising a chain having a portion thereof movable in a vertically disposed path, a shelf on the chain, a conveyer adjacent to the lower limit of movement of the shelf and disposed in a horizontal plane, a guard plate above the conveyer, in position to engage articles as they slide off the shelf and maintain them in upright position, and means controlled by movement of the chain for moving the guard plate to inoperative position.

Signed at Hartford, Conn., this 26th day of May, 1926.

RAYMOND G. BACHELLER.